United States Patent
Kancharla et al.

(10) Patent No.: US 10,425,234 B2
(45) Date of Patent: Sep. 24, 2019

(54) SYSTEMS AND METHODS FOR PERFECT FORWARD SECRECY (PFS) TRAFFIC MONITORING VIA A HARDWARE SECURITY MODULE

(71) Applicant: Cavium, LLC, Santa Clara, CA (US)

(72) Inventors: Phanikumar Kancharla, Sunnyvale, CA (US); Ram Kumar Manapragada, Hydearabad (IN); Tejinder Singh, San Jose, CA (US); Girish Kumar Yerra, Andhra Pradesh (IN)

(73) Assignee: Cavium, LLC, Santa Clara, CA (US)

( * ) Notice: Subject to any disclaimer, the term of this patent is extended or adjusted under 35 U.S.C. 154(b) by 257 days.

(21) Appl. No.: 15/248,876

(22) Filed: Aug. 26, 2016

(65) Prior Publication Data
US 2018/0062854 A1 Mar. 1, 2018

Related U.S. Application Data

(60) Provisional application No. 62/210,660, filed on Aug. 27, 2015.

(51) Int. Cl.
*H04L 9/08* (2006.01)
*H04L 9/32* (2006.01)
*H04L 29/06* (2006.01)

(52) U.S. Cl.
CPC ............ *H04L 9/3263* (2013.01); *H04L 9/083* (2013.01); *H04L 9/0844* (2013.01); *H04L 9/0897* (2013.01); *H04L 9/3249* (2013.01); *H04L 63/06* (2013.01); *H04L 63/101* (2013.01)

(58) Field of Classification Search
CPC ....... H04L 9/3263; H04L 9/14; H04L 9/3066; H04L 9/3249; H04L 9/302; H04L 63/06; H04L 63/101
USPC ....................................................... 713/153
See application file for complete search history.

(56) References Cited

U.S. PATENT DOCUMENTS

| 2007/0234061 A1* | 10/2007 | Teo ........................ G06F 21/566 713/178 |
| 2013/0191631 A1* | 7/2013 | Ylonen ............... H04L 63/1483 713/153 |

OTHER PUBLICATIONS

Federal Information Processing Standards Publication Pub 140-2 Security Requirements for Cryptographic Modules Dec. 3, 2002.*

* cited by examiner

*Primary Examiner* — Kambiz Zand
*Assistant Examiner* — Benjamin A Kaplan

(57) ABSTRACT

A new approach is proposed to support monitoring Perfect Forward Secrecy (PFS) network traffic by utilizing a hardware security module (HSM) appliance. Here, the HSM appliance is a high-performance, Federal Information Processing Standards (FIPS) 140-compliant security hardware with embedded firmware, which can be used for management and sharing of ephemeral keys used in a secured PFS communication session between two parties. Specifically, the HSM allows a server to share one or more of its ephemeral keys and/or parameters used in PFS traffic during the session with a third party under specified access rights and/or authorization, wherein the third party can be but is not limited to a traffic monitoring module. The HSM allows the third party to access the ephemeral keys stored on the HSM under the specified access rights and/or authorization so that the third party may decrypt and run analytics on the PFS traffic captured during the session.

23 Claims, 3 Drawing Sheets

SYSTEMS AND METHODS FOR PERFECT FORWARD SECRECY (PFS) TRAFFIC MONITORING VIA A HARDWARE SECURITY MODULE

CROSS-REFERENCE TO RELATED APPLICATIONS

This application claims the benefit of U.S. Provisional Patent Application No. 62/210,660, filed Aug. 27, 2015, and entitled "Perfect Forward Secrecy (PFS) Traffic Monitoring via Hardware Security Module," which is incorporated herein in its entirety by reference.

This application is related to co-pending U.S. patent application Ser. No. 14/299,739, filed Jun. 9, 2014 and entitled "Systems and Methods for Cloud-Based Web Service Security Management Based on Hardware Security Modules," which is incorporated herein in its entirety by reference.

BACKGROUND

In cryptography, Perfect Forward Secrecy (PFS) is a function of a key-exchange protocol, which results in the generation of a shared secret (e.g., pre-master secret or PMS) that may be used as an input to the key used to encrypt/decrypt an Secure Sockets Layer (SSL) session for secured communication between two parties (e.g., a web server and a browser of a client device). Key-exchange protocols that provide PFS are ephemeral because they use a temporary public/private key pair to generate the shared secret. Non-ephemeral protocols such as RSA use a long-lived secret, usually the same one for all connections, and thus the security of all sessions past and present are tied to the security of the private key. In contrast, PFS protects past sessions against future compromises of secret keys since encrypted communication sessions recorded in the past cannot be retrieved and decrypted should long-term secret keys or passwords be compromised in the future, even if the adversary actively interfered.

Until recently, SSL network traffic (e.g., network data packets being transmitted between the parties over a secured communication channel) can be monitored and analyzed by a third party monitoring platform/component that owns the RSA public/private keys that remain the same for all communication sessions. With the increasing popularity of PFS traffic, however, such RSA-based traffic monitoring scheme may no longer work due to the ephemeral nature of PFS traffic. Therefore, there is a need for a new approach to monitor PFS network traffic.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
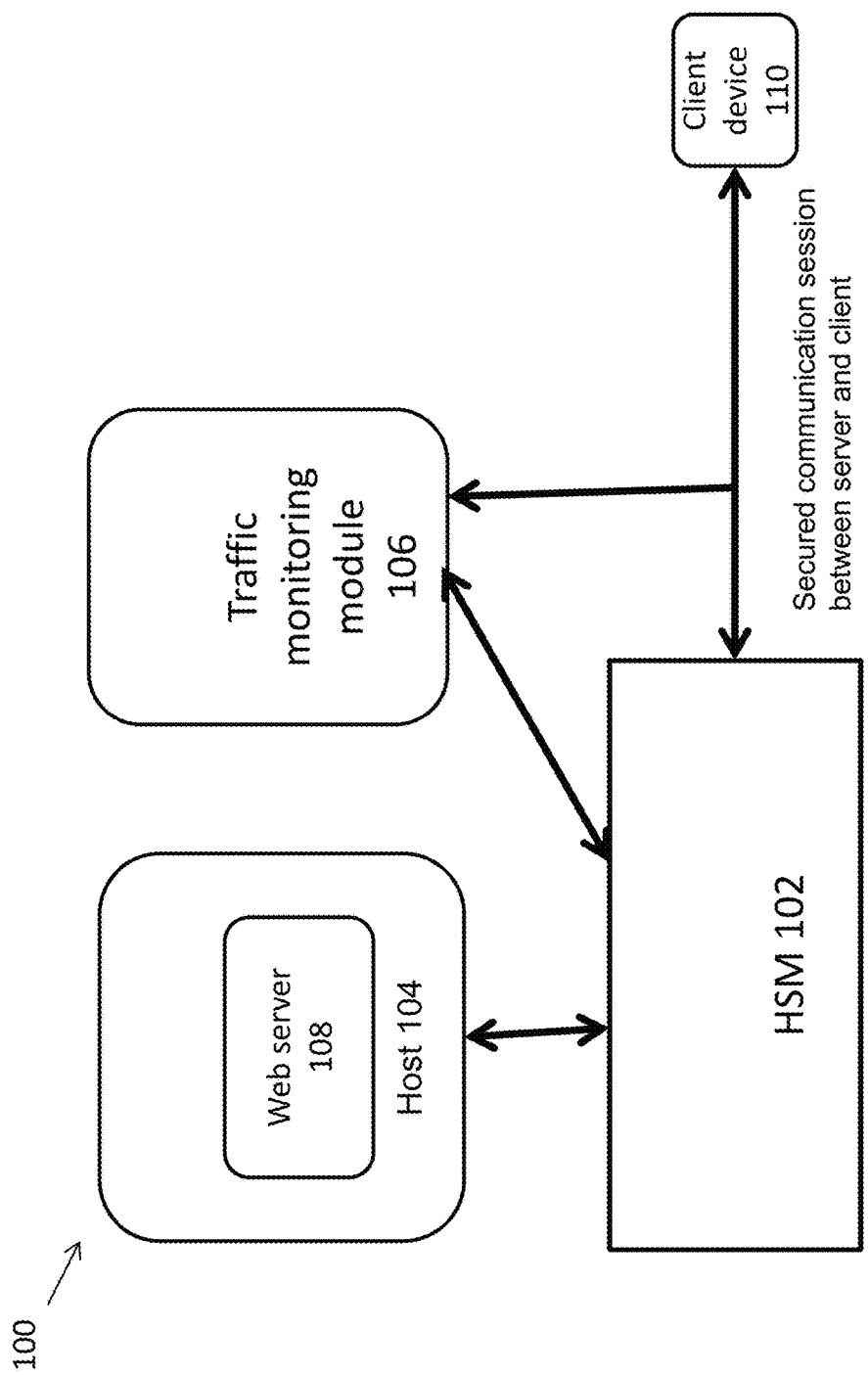
FIG. 1 depicts an example of a diagram of system to support PFS network traffic monitoring via a HSM in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support monitoring of Perfect Forward Secrecy (PFS) network traffic by utilizing a hardware security module (HSM) appliance. Here, the HSM appliance is a high-performance, Federal Information Processing Standards (FIPS) 140-compliant security hardware with embedded firmware, which can be used for management and sharing of ephemeral keys used in a secured PFS communication session between two parties. Specifically, the HSM allows a server or service to share one or more of its ephemeral keys and/or parameters used in PFS traffic during the session with a third party under specified access rights and/or authorization, wherein the third party can be but is not limited to a traffic monitoring module. The HSM allows the third party to access the ephemeral keys or key-material stored on the HSM under the specified access rights and/or authorization so that the third party may decrypt and run analytics on the PFS traffic captured during the session.

Ephemeral keys are used by PFS in key agreement process instead of long term keys to prevent information leakage from old sessions in case of long-term key compromise as discussed above. Under the proposed approach, third party applications and modules such as the traffic monitoring module are enabled to look into data exchanged during the secured communication session (e.g., SSL/TLS) using the ephemeral keys or secret maintained and shared by the HSM for traffic monitoring purposes. The services provided by the HSM can be further optimized per the key protocol requirements to either share the ephemeral keys or final session keys of the secured communication session with the third party. Importantly, the keys and the secret are kept in a FIPS 140-2 compliant secured environment on the HSM, which is accessible only by the third party under access and/or authorization by the owner of the keys/secret. No other party is able to access the keys and data maintained in the HSM without authorization.

FIG. 1 depicts an example of a diagram of system 100 to support PFS network traffic monitoring via a HSM. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a hardware security module (HSM) 102, a computing unit/appliance/host 104 having one or more web service providers/servers 108 running on it, and a third party PFS traffic monitoring module 106. In some embodiments, the HSM 102 is a multi-chip embedded hardware/firmware cryptographic module having software, firmware, hardware, or another component that is used to effectuate a purpose. The HSM 102 is certified under Federal Information Processing Standard (FIPS) for performing secured key management cryptographic operations. The computing unit/appliance/host 104 comprises one or more of a CPU or microprocessor, a memory (also referred to as primary memory) such as RAM, and a storage unit such as a non-volatile memory (also referred to as secondary memory) with software instructions stored in for practicing one or more processes. When the software instructions are executed, at least a subset of the software instructions is loaded into memory, and the computing unit becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits (ASIC) for performing the processes. For non-limiting examples, the host 104 can be a computing device, a communication device, a storage device, or any electronic device, wherein the computing device can be but is not limited to a laptop PC, a desktop PC, a mobile device, or a server machine such as an x86 or ARM server, and the communication device can be but is not limited to a mobile phone.

In the example of FIG. 1, the HSM 102, the server 104, the third party PFS traffic monitoring module 106, and a client device 110 requesting service from the server 104 each has a communication interface (not shown), which is a component that enables the components to communicate with each other and other devices/hosts/servers over a network (not shown) following certain communication protocols such as TCP/IP protocol. Such network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

Figure 2:
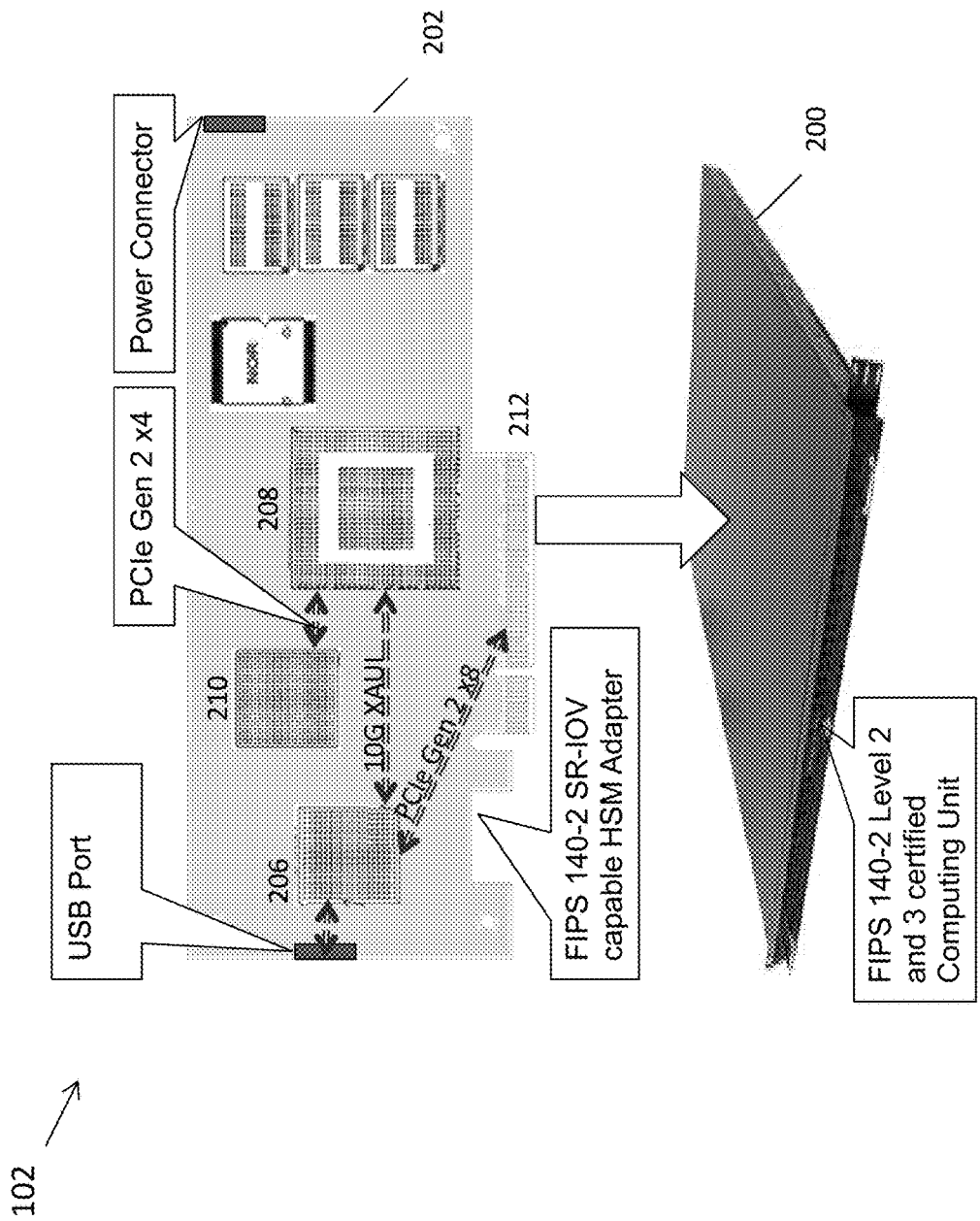
FIG. 2 depicts an example of hardware implementation 200 of the HSM depicted in FIG. 1 in accordance with some embodiments.

FIG. 2 depicts an example of hardware implementation 200 of the HSM 102 depicted in FIG. 1. As shown in the example of FIG. 2, the FIPS 140-2 Level 2 and 3 certified computing unit HSM appliance 200 includes one or more CPUs, RAM, and storage unit. The HSM appliance 200 further includes a FIPS-certified SR-IOV-capable HSM adapter 202, which further includes an SR-IOV PCIe bridge 206 connecting the HSM adapter 202 to the CPUs via a first PCIe connection (e.g., PCIe Gen2 x8), wherein PCIe is a high-speed serial computer expansion bus standard designed to support hardware I/O virtualization to enable maximum system bus throughput, low I/O pin count and a small physical footprint for bus devices. The bridge 206 is further configured to connect to a multi-core processor 208 (e.g., a multi-core MIPS64 processor such as OCTEON CN6130) of the HSM adapter 202 across a high speed communication interface (e.g., 10G XAUI Interface). The HSM adapter 202 further includes a security processor 210 (e.g., NITROX CNN3560) via a second PCIe connection (e.g., PCIe Gen 2 x4), wherein the security processor 210 is configured to enable cryptographic acceleration by performing crypto operations with hardware accelerators and embedded software implementing security algorithms. In some embodiments, the HSM appliance 200 is supplied and preconfigured with default network and authentication credentials so that the HSM appliance 200 can be FIPS/Common Criteria/PCI compliant for PFS traffic monitoring.

In the example of FIG. 1, the HSM 102 implemented via the HSM appliance 202 described above is configured to provide a FIPS 140-2 overall Level 3 certified security solution to a plurality of users/web service providers by offloading key storage and cryptographic operations from the server 104 running on the host 102. For a non-limiting example, the ephemeral keys, parameters, and secret used by the server 104 for crypto (encryption/decryption) operations of secured PFS communication/traffic over the Internet can be offloaded to, stored, and maintained on the HSM 102. In some embodiments, the HSM 102 is connected/coupled to the host 104 running the server 108 via a PCIe bus in order to interact with and to offload the ephemeral keys from the VMs 108 in a secure manner. The ephemeral keys may later be accessed by others such as the third party PFS traffic monitoring module 106 via an Application Programming Interface (API) defined and provided by the HSM 102.

In some embodiments, the server 108 is configured to communicate securely with a client device 110 requesting connection and service by the server 108 via Elliptic curve Diffie-Hellman (ECDH) protocol. Here, the client device 110 can be a computing device, a communication device, a storage device, or any electronic device. ECDH is an anonymous key agreement protocol using elliptic curve cryptography that allows two parties (server 108 and client 110), each having an elliptic curve public-private key pair, to establish a shared pre-master secret (PMS) over an insecure channel. This shared PMS may be used either as an encryption/decryption key directly, or to derive another key which can then be used to encrypt subsequent PFS communications between the server and the client device using a symmetric key cipher.

During the handshake to establish a secured ECDH communication session between the server 108 and the client 110, the client 110 may initiate a client hello message over a non-secured communication channel requesting connection to the server 108. After receiving the client hello message, the server 108 is configured to generate an unique random number and an ID for a SSL session with the client 110. Here, the session ID is an unique ID derived from the unique random number. The server 108 is further configured to call APIs provided by the HSM 102 to generate ECDH key/parameters used by the server 108 for the ECDH session.

In some embodiments, the HSM 102 is configured to accept a plurality of parameters passed by the server 108 via the API calls for the ECDH key generation. Such input parameters passed by the server 104 include but are not limited to ECDH curve type, client 110 as identified by its network/IP address, the random number and the SSL session ID generated by the server 108, RSA and/or Elliptic Curve Digital Signature Algorithm (ECDSA) key handle for signature, and supporting access rights and/or authorization policy data as to which third parties can access the derived keying materials and the server's ECDH parameters/keys. Upon receiving the parameters, the HSM 102 is configured to select an ECDH private key/parameters for the server 108 suitable for the ECDH curve type, store the ECDH private key in its memory (e.g., RAM) in a HSM table along/in association with the access rights and/or authorization policy data with key_ID attribute set to the SSL_Session_ID provided as an index to the HSM table. Note that the HSM 102 is FIPS 140-2 compliant, which meets FIPS compliance requirements of the ECDH private keys of the server 108. The HSM 102 is then configured to compute ECDH public key/parameters and signature of the server 108 based on private parameters and the random number received. The HSM 102 is then configured to provide the calculated ECDH public parameters signed by the RSA/ECDSA signature or authentication key of the server 108 to the client device 110 in the form of a server hello message. Note that all of the public/private keys of the server 108 are ephemeral session keys that are only valid and used during the current ECDH session. The ephemeral keys will expire and be removed from the HSM table after the current ECDH session or timeout.

Upon receiving the server hello message from the HSM 102, the client 110 generates and provides its own ECDH public key/parameters to the server 108. After receiving the public key parameters from the server 108 is further configured to call APIs provided by the HSM 102 and pass the public key parameters to the HSM 102 to generate a PMS to be shared with the client 110 (and a third party as discussed below) during the session. Specifically, the HSM 102 is configured to accept key_ID (i.e., SSL_session_ID) and the client's ECDH public parameters from the server 108. The HSM 102 is then configured to compute the PMS for the server 108 as an ECDH value based on the public keys and parameters of the server and the client. The HSM 102 then stores the computed PMS in the HSM table with the key_ID/ SSL_session_ID as its index. Finally, the HSM 102 is configured to share the computed PMS with the client 110, wherein the PMS is used as the key or to generate a key for the ECDH session between the server 108 and the client 110.

Once the ECDH session is established between the server 108 and client 110, the third party PFS traffic monitoring module 106 (e.g., Extrahop) is configured to capture, monitor, and analyze PFS network traffic data exchanged between the server 108 and client 110. Note that the PFS traffic monitoring module 106 has access to the ECDH public parameters of the server 108 and client 110, and it does not require access to the RSA/ECDSA key as it does not have to generate a signature. It does, however, need to get the PMS of the particular SSL session between the server 108 and client 110 from the HSM 102 for decrypting the PFS traffic data captured during the SSL session.

In some embodiments, the PFS traffic monitoring module 106 is configured to obtain the PMS from the HSM 102 via the following process. First, the PFS traffic monitoring module 106 is configured to retrieve the key_ID/SSL_session_id from captured messages (e.g., client and/or server hello messages) exchanged between the server 108 and client 110 during setup of the ECDH session. The PFS traffic monitoring module 106 is then configured to call an API provided by the HSM 102 and pass the key_ID to the HSM 102. The HSM 102 is then configured to check its access rights and/or authorization policy data stored in the HSM table to determine if the PFS traffic monitoring module 106 is allowed access to the PMS and the keys. If so, the HSM 102 is configured to lookup the PMS from the HSM table using the key_ID and provide the PMS to the PFS traffic monitoring module 106, which may then use the PMS to decrypt and analyze PFS data captured during the current ECDH session between the server 108 and the client 110. In some embodiments, the PFS traffic monitoring module 106 is also optionally configured to verify the (RSA/ECDSA) signature of the server 108 using the server certificate captured from the PFS traffic between the server 108 and client 110.

In some embodiments, the HSM 102 is configured to adopt a policy-based access control list (ACL) as part of the policy data on third party access rights and/or authorization to control access rights and authorization by the third party PFS traffic monitoring module 106 to the PMS and keys maintained in the HSM 102. In some embodiments, the HSM 102 is configured to record one or more of user (the third party) information, the session information, and purpose of the third party that has requested to access the PMS and keys in a usage log associated with the HSM table. As the owner of the PMS and the keys, the server 108 is allowed by the HSM 102 to inspect the ACL and the usage log at any time to audit the usage by the third parties and to edit (add or delete) access rights and authorization by the third parties.

In some embodiments, the HSM 102 is configured to support and require identity-based authentication for access to the PMS and the keys by the PFS traffic monitoring module 106 as required by the FIPS 140-2 level 3. In some embodiments, the PFS traffic monitoring module 106 that wants to access the PMS and keys maintained by the HSM 102 needs to provide the HSM 102 with a valid certificate, wherein the certificate is issued by a trusted certificate authority (CA). In some embodiments, the PFS traffic monitoring module 106 needs to supply the HSM 102 with a complete chain of CA certificates, which are all active and have not been revoked.

In some embodiments, the HSM 102 is configured to accept and store various types of key-related objects, which include but are not limited to secured authentication credentials, client/server generated/imported keys, parameters, PMS, and certificates of the web service host/server 104. Here, all of the objects stored in the HSM 102 are maintained in an isolated and tamper-proof environment, e.g., FIPS 140-2 Level 3 certified hardware implementation of the HSM 102 (e.g., HSM adapter 200), with nothing being stored anywhere else in the system 100. In some embodiments, the objects are encoded and encrypted via an encryption key before being stored in the HSM 102, wherein the encryption key is unique for the HSM 102. Consequently, no entity except for owner/server 104 and those on the ACL list can have access the PMS and keys maintained by the HSM 102.

In some embodiments, the HSM 102 is configured to support object operations including but not limited to generating, deleting, finding, and creating of the objects stored on the HSM 102. Here, each object is stored in the HSM 102 along with the key/session ID and its attributes, which include but are not limited to timestamps, user, usage, etc. The HSM 102 is configured to check every object for validity (e.g., date and time) based on the stored attributes before sharing it with the third party PFS traffic monitoring module 106. In some embodiments, the HSM 102 supports retrieving and modifying of selected attributes of the objects in the HSM 102.

Figure 3:
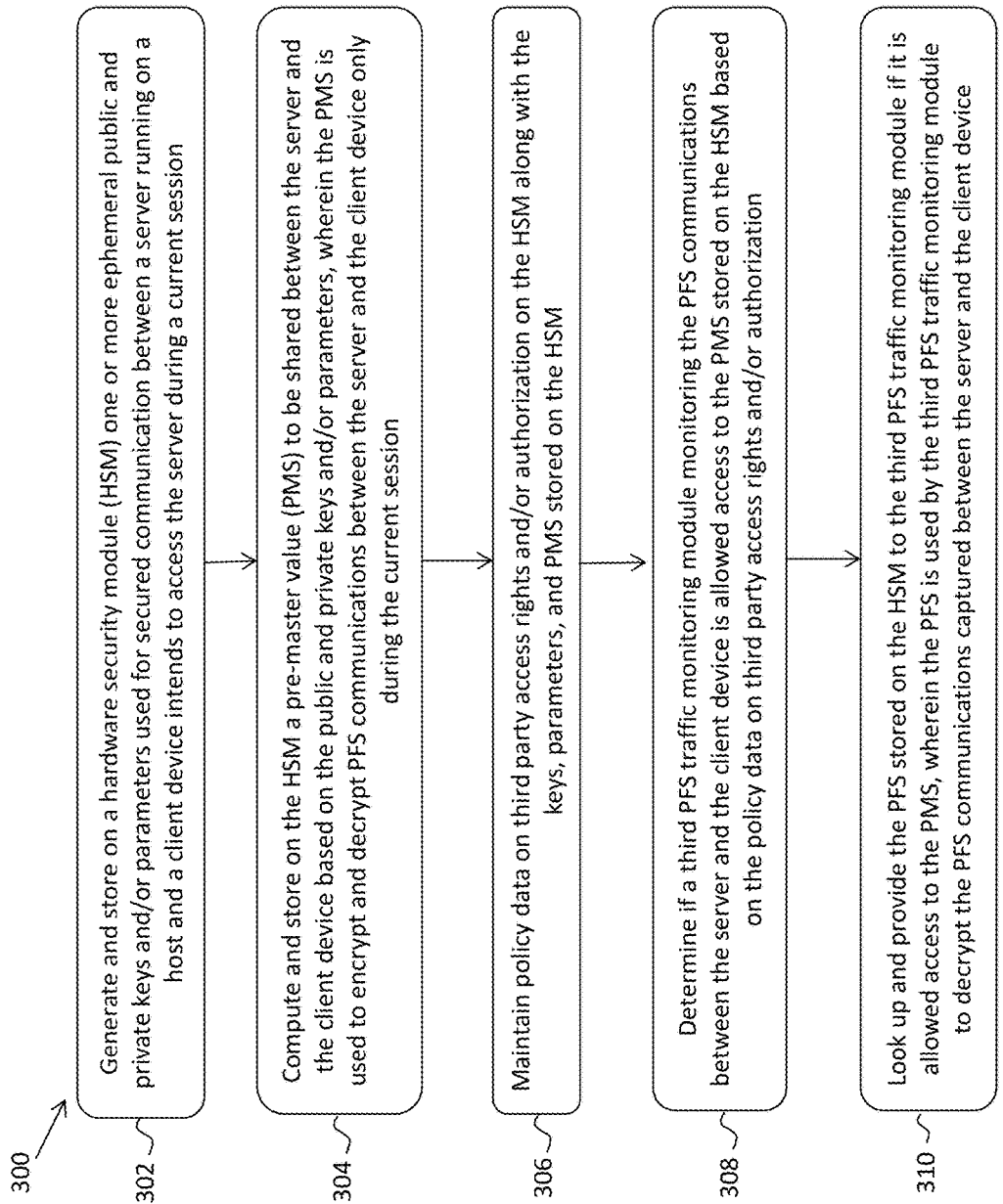
FIG. 3 depicts a flowchart of an example of a process to support PFS network traffic monitoring via a HSM in accordance with some embodiments.

FIG. 3 depicts a flowchart of an example of a process to support PFS network traffic monitoring via HSM. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where one or more ephemeral public and private keys and/or parameters used for secured communication between a server running on a host and a client device intends to access the server during a current session are generated and stored on a hardware security module (HSM). The flowchart 300 continues to block 304, where a pre-master value (PMS) to be shared between the server and the client device is computed and stored on the HSM based on the public and private keys and/or parameters, wherein the PMS is used to encrypt and decrypt PFS communications between the server and the client device only during the current session. The flowchart 300 continues to block 306, where policy data on third party access rights and/or authorization are maintained on the HSM along with the keys, parameters, and PMS stored on the HSM. The flowchart 300 continues to block 308, where if a third PFS traffic monitoring module monitoring the PFS communications between the server and the client device is allowed access to the PMS stored on the HSM is determined based on the policy data on third party access rights and/or authorization. The flowchart 300 ends at block 310, where the PFS stored on the HSM is looked up and provided to the third PFS traffic monitoring module if it is allowed access to the PMS, wherein the PFS is used by the third PFS traffic monitoring module to decrypt the PFS communications captured between the server and the client device.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support Perfect Forward Secrecy (PFS) network traffic monitoring, comprising:
   a hardware security module (HSM), which is a hardware module dedicated to secured key management cryptographic operations and configured to:
   generate and store on the HSM one or more ephemeral public and private keys and/or parameters used for secured communications between a server running on a host and a client device intends to access the server during a current session;
   compute and store on the HSM a pre-master secret (PMS) to be shared between the server and the client device based on the public and private keys and/or parameters, wherein the PMS is used to encrypt and decrypt PFS communications between the server and the client device only during the current session;
   maintain policy data on third party access rights and/or authorization on the HSM along with the keys, the parameters, and the PMS stored on the HSM;
   determine if a third party PFS traffic monitoring module separated from the HSM, the client device, and the server and monitoring the PFS communications between the server and the client device is allowed access to the PMS stored on the HSM based on the policy data on third party access rights and/or authorization;
   look up and provide the PFS stored on the HSM to the third party PFS traffic monitoring module if it is allowed access to the PMS, wherein the PFS is used by the third party PFS traffic monitoring module to decrypt the PFS communications captured between the server and the client device.

2. The system of claim 1, wherein:
   the HSM is a multi-chip embedded Federal Information Processing Standards (FIPS) 140-compliant hardware module with firmware configured to perform the secured key management cryptographic operations.

3. The system of claim 2, wherein:
   the keys, the parameters, and the PMS are kept in a FIPS 140-2 compliant secured environment on the HSM, which is accessible only by the third party PFS traffic monitoring module under the policy data on third party access rights and/or authorization.

4. The system of claim 1, wherein:
   the shared PMS is used either as an encryption key directly or to derive another key which is be used to encrypt the PFS communications between the server and the client device.

5. The system of claim 1, wherein:
   the HSM is configured to store the keys, the parameters, the PMS, and the policy data on third party access rights and/or authorization in a HSM table with a key ID attribute set to a unique session ID of the session, wherein the key ID is provided as an index to the HSM table.

6. The system of claim 5, wherein:
   the keys, the parameters, and the PMS are removed from the HSM table after the current session or timeout.

7. The system of claim 5, wherein:
   the HSM is configured to record one or more of third party information, the session information, and purpose of the third party PFS traffic monitoring module to access the PMS and/or the keys in a usage log associated with the HSM table.

8. The system of claim 1, wherein:
   the server is configured to communicate securely with the client device via Elliptic curve DiffieHellman (ECDH) protocol.

9. The system of claim 1, wherein:
the HSM is configured to
  compute a signature of the server based on the private parameters and a random number generated by the server;
  sign the computed public keys and parameters by the signature of the server and provide them to the client device.

10. The system of claim 1, wherein:
the HSM is configured to adopt a policy-based access control list (ACL) as part of the policy data on third party access rights and/or authorization to control access rights by the third party PFS traffic monitoring module to the PMS and keys maintained in the HSM.

11. The system of claim 10, wherein:
the HSM is configured to allow the server to inspect the ACL and the usage log at any time to audit usage by the third party PFS traffic monitoring module and to edit the policy data on third party access rights and authorization.

12. The system of claim 1, wherein:
the HSM is configured to require identity-based authentication for access to the PMS and the keys by the PFS traffic monitoring module as required by the FIPS 140-2 level 3, wherein the PFS traffic monitoring module is required to provide a valid certificate issued by a trusted certificate authority.

13. A method to support Perfect Forward Secrecy (PFS) network traffic monitoring, comprising:
  generating and storing on a hardware security module (HSM), which is a hardware module dedicated to secured key management cryptographic operations, one or more ephemeral public and private keys and/or parameters used for secured communications between a server running on a host and a client device intends to access the server during a current session;
  computing and storing on the HSM a pre-master secret (PMS) to be shared between the server and the client device based on the public and private keys and/or parameters, wherein the PMS is used to encrypt and decrypt PFS communications between the server and the client device only during the current session;
  maintaining policy data on third party access rights and/or authorization on the HSM along with the keys, parameters, and PMS stored on the HSM;
  determining if a third party PFS traffic monitoring module separated from the HSM, the client device, and the server and monitoring the PFS communications between the server and the client device is allowed access to the PMS stored on the HSM based on the policy data on third party access rights and/or authorization;
  looking up and providing the PFS stored on the HSM to the third party PFS traffic monitoring module if it is allowed access to the PMS, wherein the PFS is used by the third party PFS traffic monitoring module to decrypt the PFS communications captured between the server and the client device.

14. The method of claim 13, further comprising:
keeping the keys, the parameters, and the PMS in a FIPS 140-2 compliant secured environment on the HSM, which is accessible only by the third party PFS traffic monitoring module under the policy data on third party access rights and/or authorization.

15. The method of claim 13, further comprising:
using the shared PMS either as an encryption key directly or to derive another key which is be used to encrypt the PFS communications between the server and the client device.

16. The method of claim 13, further comprising:
storing the keys, the parameters, the PMS, and the policy data on third party access rights and/or authorization in a HSM table with a key ID attribute set to a unique session ID of the session, wherein the key ID is provided as an index to the HSM table.

17. The method of claim 16, further comprising:
removing the keys, the parameters, and the PMS from the HSM table after they expire after the current session or timeout.

18. The method of claim 16, further comprising:
recording one or more of third party information, the session information, and purpose of the third party PFS traffic monitoring module to access the PMS and/or the keys in a usage log associated with the HSM table.

19. The method of claim 13, wherein:
the server communicates securely with the client device via Elliptic curve Diffie-Hellman (ECDH) protocol.

20. The method of claim 13, further comprising:
computing a signature of the server based on the private parameters and a random number generated by the server;
signing the computed public keys and parameters by the signature of the server and provide them to the client device.

21. The method of claim 13, further comprising:
adopting a policy-based access control list (ACL) as part of the policy data on third party access rights and/or authorization to control access rights by the third party PFS traffic monitoring module to the PMS and keys maintained in the HSM.

22. The method of claim 21, further comprising:
allowing the server to inspect the ACL and the usage log at any time to audit usage by the third party PFS traffic monitoring module and to edit the policy data on third party access rights and authorization.

23. The method of claim 13, further comprising:
requiring identity-based authentication for access to the PMS and the keys by the PFS traffic monitoring module as required by the FIPS 140-2 level 3, wherein the PFS traffic monitoring module is required to provide a valid certificate issued by a trusted certificate authority.

* * * * *

UNITED STATES PATENT AND TRADEMARK OFFICE
CERTIFICATE OF CORRECTION

| | | |
|---|---|---|
| PATENT NO. | : 10,425,234 B2 | Page 1 of 1 |
| APPLICATION NO. | : 15/248876 | |
| DATED | : September 24, 2019 | |
| INVENTOR(S) | : Phanikumar Kancharla et al. | |

It is certified that error appears in the above-identified patent and that said Letters Patent is hereby corrected as shown below:

On the Title Page

Item (60), under "Related U.S. Application Data", please add the following benefit claim:
--Provisional application No. 62/210,660 filed on Aug. 27, 2015.--

Signed and Sealed this
Third Day of March, 2020

Andrei Iancu
*Director of the United States Patent and Trademark Office*